Jan. 26, 1965       J. LIERMANN                3,167,483
       DEVICE FOR ALIGNING FUEL CARTRIDGES IN
           A CHANNEL OF A NUCLEAR REACTOR
                 Filed March 27, 1963
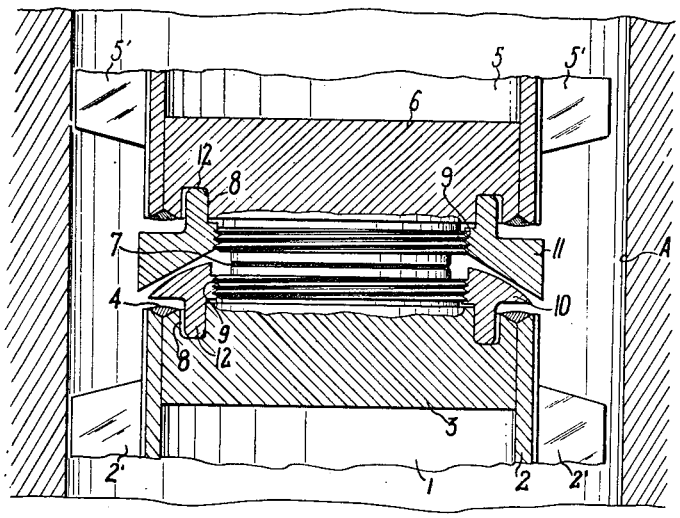

United States Patent Office 3,167,483
Patented Jan. 26, 1965

3,167,483
DEVICE FOR ALIGNING FUEL CARTRIDGES IN A CHANNEL OF A NUCLEAR REACTOR
Jean Liermann, Paris, France, assignor to Commissariat a l'Energie Atomique, Paris, France
Filed Mar. 27, 1963, Ser. No. 268,395
Claims priority, application France, Apr. 6, 1962, 893,592
2 Claims. (Cl. 176—77)

The present invention relates to fuel elements or cartridges employed in nuclear reactors and concerns more particularly a device for coaxially aligning these cartridges with one another when they are stacked in a channel in such a reactor.

It is already known to provide the terminal portions of such cartridges with centering elements consisting of extension members formed with conical portions adapted to fit one into the other and provided with fins bearing against the walls of the channel in which the cartridges are disposed. However, apart from other disadvantages, these centering elements increase the length of the cartridges, exhibit troublesome neutron absorption and, by reason of their fragility, cause complications in handling.

The present invention has for its object to obviate these disadvantages by means of a device which effects with the necessary precision the centering and alignment of the cartridges in relation to one another as they are introduced into the channel, without the use of guide means disposed between the set of cartridges and the wall of the channel, without increasing the length of the cartridges and without adding any appreciable complication to their structure.

The cartridge-aligning device according to the invention comprises, on each cartridge, a male portion and a female portion which are each secured to one of the terminal plugs, each male (or female) portion consisting of an annular ring surrounding the bearing face of the plug and having a semi-toroidal outer surface, and each female (or male) portion of an annular ring surrounding the bearing surface of the other plug and having a frusto-conical external surface.

In one arrangement according to the invention, applicable more particularly in the case when the channel containing the cartridges is vertical, the male and female portions which effect the centering and the alignment have sufficient longitudinal clearance between them to enable each cartridge to rest on that one which is situated immediately below it merely through terminal plugs, that is to say, independently of the centering elements.

It is thereby possible to make each cartridge self-centering by the use of simple, robust members of small dimensions. Moreover, since these members are fast with the cartridges themselves, they do not substantially modify their geometrical form and do not in any way complicate the problems relative to the loading and unloading of the channels.

The invention will now be described by way of example with reference to the accompanying drawings the single figure of which is a fragmentary vertical sectional view of the upper and lower ends of two successive cartridges aligned with one another by means of the device of the invention.

The cartridges are contained in a channel A, which is either vertical or horizontal. The lower cartridge, denoted by the reference 1, comprises a casing 2 provided with fins 2' and closed in fluid-tight fashion at its upper end by a plug 3 secured to the casing by means of a continuous weld 4. The upper cartridge 5, which is identical with the cartridge 1 and is provided with fins 5', rests on the cartridge 1 by means of the lower face of its plug 6, the plugs 3 and 6 bearing one against the other at a contact surface 7. In accordance with the invention, each of the two plugs is adapted to receive a centering member. The plugs illustrated in the figure are formed with an annular groove 8 and a screwthreaded portion 9 for securing a male member 10 to the plug 3 and a female member 11 to the plug 6. The members 10 and 11, or centering elements, are both in the form of annular rings comprising a cylindrical portion 12 partially tapped to engage in the groove 8 and to be screwed on to the portion 9.

In the illustrated embodiment, the members 10 and 11 are screwed until they abut the base of the grooves 8, but in other embodiments the inter-engagement could be effected, for example, by abutment of an internal flange in the members 10 and 11 against the terminal shoulder of the screwthreaded portions 9.

The male member 10, which is fast with the plug 3, has its external surface profiled in the form of a toroidal segment so as to slide within the internal conical portion of the female member 11, thus ensuring alignment of the upper cartridge 5 with the lower cartridge 1. The precision of this alignment is determined by the value of the clearance between the two members 10 and 11 when the axes are exactly coincident.

The operation of the device is sufficiently apparent to require only a brief description. When the cartridge 1 is in position, the cartridge 5 is lowered, for example by means of a grab, by means of which it is maintained along the axis of the channel. If the decentering of the opposed faces of the cartridges is greater than the predetermined maximum value, the initial contact takes place between two zones only of the members 10 and 11. As the downward movement of the grab continues, the members 11 and 10 slide one upon the other, the cartridge 1 being able in this movement to change its position slightly in relation to the cartridge above which it is situated, within the limits of the maximum predetermined decentering. The centering operation ceases when the plugs 3 and 6 come into contact (the lateral spacing then being reduced to the predetermined maximum value) and when the cartridge 5 bears with its entire weight on the cartridges above which it is mounted.

It is to be noted that this operation effects only the relative centering of the opposed faces of the cartridges in relation to one another, and not the centering of the set of cartridges in relation to the channel A.

The device according to the invention thus has many advantages, due notably to the small overall dimensions of the parts employed, which do not in any way increase the total height of the set of cartridges stacked in the channel and thus only very slightly modify the length of each cartridge individually and can be fitted to any existing cartridges. Each centering element is very simply secured, in such a manner that the surface of the plug is left entirely free so as to permit the positioning of special devices. Finally, the presence of the members 10 and 11 strengthens the plugs and performs a shock-absorbing function which in some cases would have to be performed by additional members.

More generally, it is also to be noted that the centering members or elements according to the invention only ensure the alignment of the cartridges when they are being positioned, while leaving to the plugs provided for this purpose the force-transmitting function for which they are designed and for which they are more suitable.

I claim:
1. A plurality of nuclear reactor fuel cartridges stacked end-to-end in a nuclear reactor channel the ends of the cartridges being closed by plugs, including means for aligning the fuel cartridges comprising an annular ring surrounding each of said plugs, a semi-torodial outer surface for one of said rings of an adjacent pair of said rings, a frustro-conical external surface on the other of said rings of said adjacent pair of rings, said frustro-conical surface mating with said semi-torodial surface and aligning the adjacent cartridges, said surfaces having clearance when the adjacent cartridges are aligned whereby the adjacent plugs are in engagement.

2. Fuel cartridges as described in claim 1 including a circular groove in each of said plugs, a cylindrical portion for each of said annular rings engaged in the adjacent one of said grooves and cooperating threads on said plugs and in said rings for securing said rings to said plugs.

References Cited by the Examiner
FOREIGN PATENTS 226,454  1/60  Australia.
875,462  8/61  Great Britain.

OTHER REFERENCES 1,050,923  1/59  Germany.

CARL D. QUARFORTH, *Primary Examiner*.